United States Patent [19]

Hovey et al.

[11] Patent Number: 4,562,347
[45] Date of Patent: Dec. 31, 1985

[54] INPUT DEVICE FEATURING BOTH TRACKBALL AND MOUSE CAPABILITY

[75] Inventors: Dean A. Hovey, Los Altos; Douglas R. Grundstrom, San Jose; James R. Yurchenco, Palo Alto, all of Calif.

[73] Assignee: Trace Systems, Inc., Santa Clara, Calif.

[21] Appl. No.: 535,305

[22] Filed: Sep. 23, 1983

[51] Int. Cl.⁴ ............................................. G01V 9/04
[52] U.S. Cl. .............................. 250/221; 74/471 XY; 33/1 M; 340/710; 250/231 SE
[58] Field of Search ...................... 250/231 SE, 221; 364/190; 340/710; 74/471 R, 471 XY; 33/1 M; 338/15, 128

[56] References Cited

U.S. PATENT DOCUMENTS 3,541,541 11/1970 Engelbart ............................ 340/710
3,892,963 7/1975 Hawley et al. ................. 250/231 R
3,987,685 10/1976 Opocensky ..................... 74/471 XY Primary Examiner—David C. Nelms
Assistant Examiner—James Gatto
Attorney, Agent, or Firm—Limbach, Limbach & Sutton

[57] ABSTRACT

An input apparatus for use with a computer, including a housing having a top aperture and a bottom aperture, a spherical member supported in the housing so that a portion thereof protrudes through the top and bottom apertures, and encoding means for transforming the motion of the ball into computer compatible signals, wherein the input apparatus can be moved over a surface, so as to function as a mouse, or can be supported by its housing, with motive force applied to the portion of the spherical member protruding from the top aperture, so as to function as a trackball.

8 Claims, 4 Drawing Figures

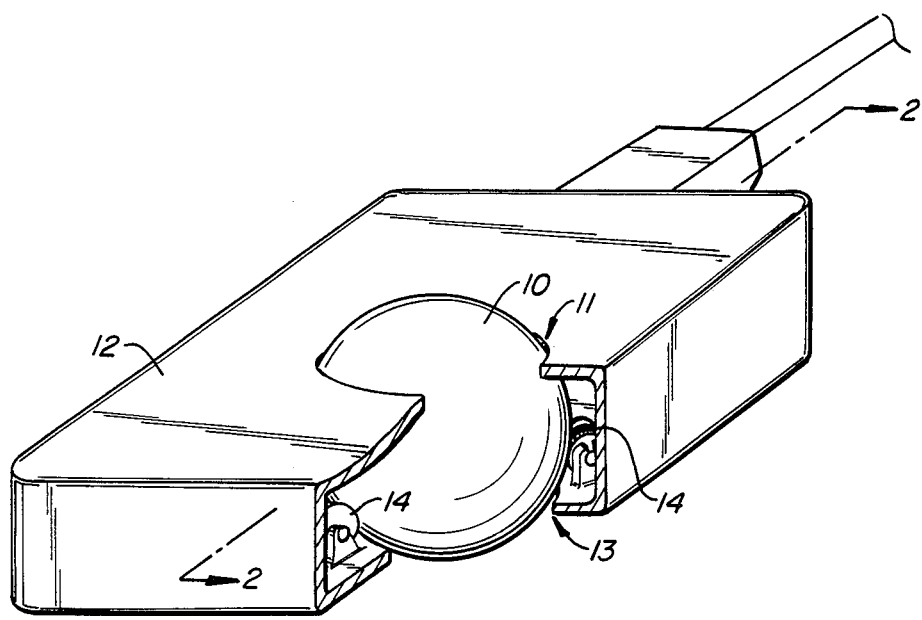
FIG._1.
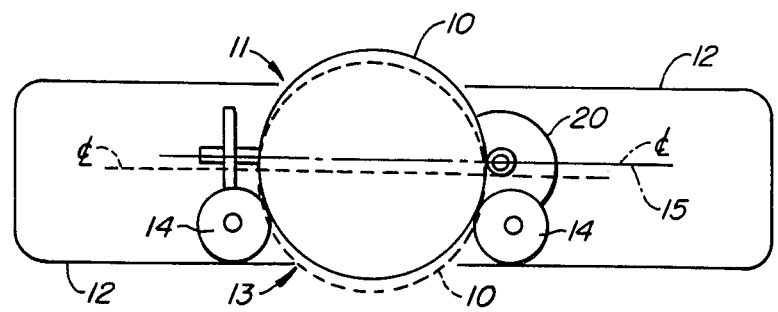
FIG._2.

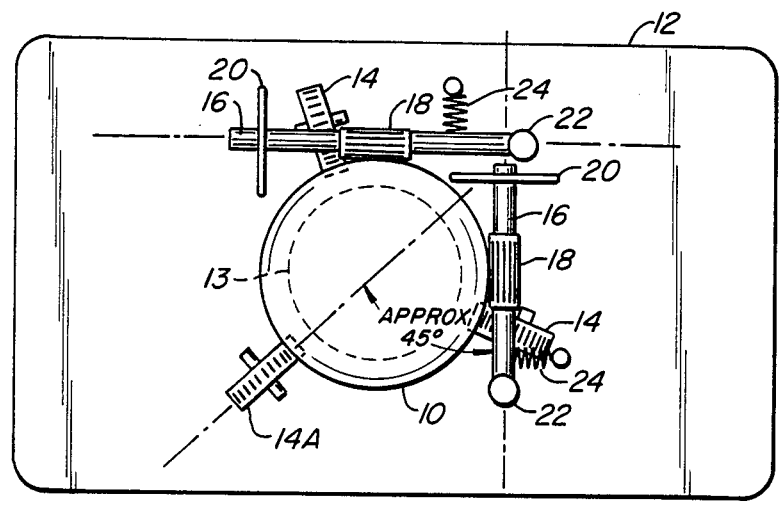
FIG._3.
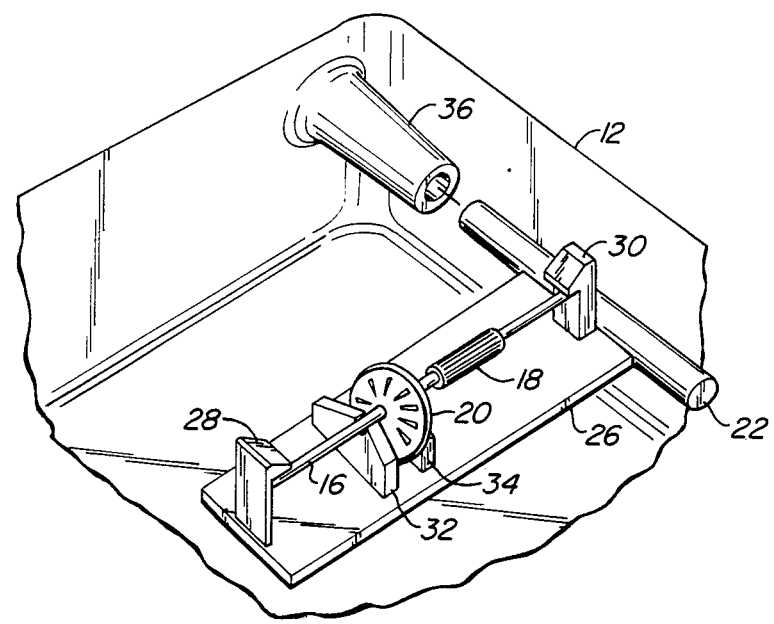
FIG._4.

INPUT DEVICE FEATURING BOTH TRACKBALL AND MOUSE CAPABILITY

TECHNICAL FIELD

The present invention is directed, in general, to an input apparatus for use with a computer or the like, and, more particularly, to a combined mouse and trackball.

BACKGROUND ART

In the past, information has been entered into computing systems through a wide variety devices. Several of the more familiar devices are the keyboard, punchcards, magnetic tape, and the like. Recently, alternative devices such as the light pen, the trackball, and the mouse have gained popularity.

A mouse is generally a device which rests upon a surface and which, when moved over the surface, translates such movement into physical position signals. These signals, when provided to a computer in connection with a visual display, can be utilized to move a cursor, for example, about the visual display. U.S. Pat. Nos. 3,541,541; 3,835,464; 3,892,963; and 3,987,685 are illustrative of mouse apparatus.

A trackball is generally a device which remains stationary when in operation. A trackball generally includes a ball which is supported within a housing and which is permitted to rotate in the housing. The ball usually protrudes through the top of the housing so that the user can supply motive force directly to the ball at the point of protrusion. Trackballs are manufactured by a number of companies including Wico Corporation of Niles, Ill. and Measurement Systems, Inc. of Norwalk, Conn.

The existence of both mouses and trackballs is indicative of the fact that a mouse can perform certain tasks which a trackball cannot, and vice versa. For example, a mouse provides control over the information being input in that the movement of a mouse over a surface is analagous to movement of the hand in a writing situation. With a mouse, the motion of the mouse over a surface can be viewed as an operation in a Cartesian coordinate system. Thus, there is no need to convert the motion of the mouse from another coordinate system into the Cartesian coordinate system typically used on display screens.

Conversely, a trackball permits the coverage of large distances quickly. When the user imparts motive force to the ball, the momentum of the ball causes the ball to rotate through several complete rotations before the ball comes to rest. On the other hand, the motion of the ball can be viewed as an operation in the spherical coordinate system. Thus, the user is required to mentally convert the motion of the ball from the spherical system into the Cartesian coordinate system.

Thus, it can be seen that a device that provides both a trackball and a mouse function would be highly desirable, as well as more hardware efficient. Heretofore, no such device has existed.

While the obvious solution would be to merely turn a mouse or trackball upside down in order to obtain the other function, there are certain mechanical problems associated with such a solution. One such problem would be the requirement of an additional supporting system, since the original device would have been designed to support its rotating member in a downward or upward direction, but not both. Additionally, when the mouse or trackball is turned over and operated, the direction of physical motion of the rotating member will be encoded in a reverse direction from its normal operation.

DESCRIPTION OF INVENTION

The foregoing and other problems of prior art mouses and trackballs are overcome by the present invention of an input apparatus for use with a computer including a housing, a spherically shaped member rotatably supported in the housing, and encoding means supported in the housing and in contact with the spherically shaped member for transforming the motion of the spherically shaped member into computer compatible signals. The housing includes top and bottom apertures which are coaxial with one another. The spherically shaped member is positioned in the housing so that a portion thereof protrudes from the top and bottom apertures. The spherically shaped member is supported in the housing so that it rotates freely, unencumbered by downward vertical loading, whenever the portion thereof, which protrudes from the bottom aperture, is supported on a surface, and so that the spherically shaped member is rotatably supported when the input apparatus is supported apart from a supporting surface.

It is therefore an object of the present invention to provide an input apparatus having both mouse and trackball capabilities.

It is another object of the present invention to provide a mouse and trackball apparatus in which the spherically shaped member is unencumbered by downward vertical loading when operated in the mouse mode.

It is a further object of the present invention to provide an input device which functions as a mouse and a trackball and which need not be turned over in order to change from one function to the other.

These and other features, objectives, and advantages will be realized upon consideration of the following detailed description and accompanying drawings.

DESCRIPTION OF THE DRAWINGS

FIG. 1 is a simplified, cut-away view of the present invention.

FIG. 2 is a simplified cross section of the present invention taken along lines 2—2 in FIG. 1.

FIG. 3 is a top view of the internal mechanical structure of the present invention.

FIG. 4 is a simplified illustration of the encoder assembly of the present invention.

DETAILED DESCRIPTION

Referring to FIG. 1, a housing 12 is employed which has a top aperture 11 and a bottom aperture 13. Apertures 11 and 13 are coaxial with one another. A spherically shaped member, such as a ball 10, is positioned in the housing 12. The radius of ball 10 is selected so that a portion of ball 10 protrudes through top aperture 11, and a portion of ball 10 protrudes through bottom aperture 13. This can be seen more clearly in FIG. 2.

When the present invention is supported by its housing 12, ball 10 is supported within the housing by support members 14. These members 14 can be wheels, bearings, or the like.

As can be seen in FIG. 2, support members are positioned in the housing and with respect to ball 10 so that they contact with ball 10 at points below the centerline 15 thereof. Thus, when the present invention is used as a mouse, i.e. ball 10 is supported on a surface at the portion which protrudes from bottom aperture 13, ball 10 is positioned apart from support members 14. Thus, ball 10 is permitted to rotate without downward vertical loading when the device is used as a mouse. By downward vertical loading is meant a force in the downward direction onto the ball 10. Typically this force arises in other mouse apparatus from the force of the user's hand on the outer case of the mouse. This force is allowed to be transmitted through the ball 10 to the surface. At times, the force applied by the user is great enough such that the frictional forces between the ball 10 and the surface are overcome, causing the ball to skid over the surface. The signal generation or encoding would thus be impaired. In the present invention, the elimination of this downward vertical loading permits ball 10 to rotate without skidding on the supporting surface, especially on a smooth, hard surface.

The above is illustrated in FIG. 2 wherein the solid outline of ball 10 indicates the position of ball 10 when operated as a mouse. The dotted outline of ball 10 indicates the position thereof when the present invention is operated as a trackball. It is to be understood that the differences in orientation are shown exaggerated in FIG. 2 for purposes of illustration.

Thus, it can be seen that by permitting the ball 10 to protrude at the top and bottom of housing 12, the device can be used as either a trackball or a mouse without the need to turn the device over. When used as a trackball, the user simply supports the housing 12 so that the ball no longer rests on the surface, and applies motive force to the portion of the ball which protrudes from top aperture 11. When using the device as a mouse, the user simply rests the portion of ball 10 which protrudes from bottom aperture 13 on a surface and moves the device over the surface. The change between operation as a mouse and a trackball is simple and immediate, and no change in encoding is required.

Preferably, housing 12 is formed in two pieces, a top piece and a bottom piece. Also, the radius of top and bottom apertures 11 and 13 are preferably selected to be less than the radius of ball 10. Thus, during assembly, ball 10 would be positioned in the aperture for one of the halves of housing 12, and the other half of housing 12 would then be sandwiched over ball 10. Ball 10 would thus be confined within housing 12 between top and bottom apertures 11 and 13, and supported by support members 14.

Preferably, the top aperture 11 is made as large as possible, consistent with retaining the ball 10 within housing 12, so as to maximize the exposed surface area of the ball 10. This, in turn, maximizes the amount of rotational displacement, per hand motion, that the user can impart to ball 10 when in a trackball mode. Conversely, bottom aperture 13 is selected in radius to be large enough to permit the ball 10 to protrude therethrough and contact a supporting surface, but small enough to prevent light and debris from entering the housing 12.

Three support members 14 and 14A are used for stable support of ball 10. The points of contact between support members 14 and 14A and ball 10 are selected to be close enough to the midpoint of ball 10 to compensate for the rotational moments produced by the motive force supplied by the user to ball 10. Preferably, the distance of the points of contact from the midpoint of the ball 10 will be substantially equal to the distance between the midpoint of the ball 10 and the top surface of the housing, i.e. to the plane through the ball 10 which is coincident with the top surface of the housing. Where the distance between the contact points and the midpoint is larger, there is a higher probability that the ball 10 will climb out of the support structure and make contact with the housing 12. In turn, this interferes with the free rotation of the ball 10.

Preferably, support members 14 and 14A are spaced apart equally, eg. 120 degrees apart. This minimizes preferential motion and precession of the ball 10. The support members 14 and 14A can be wheels, rollers, ball bearings, or low friction pads. In the preferred embodiment of the invention, retaining type ball bearings are used.

The support members 14 and 14A are supported so as to minimize the frictional component which arises from their contact with ball 10. It has been discovered that supporting each member 14 and 14A by an axle provides a significant reduction of the frictional component.

When the device is used as a mouse, the ball 10 is supported by the surface and moved upwards with respect to support members 14 and 14A. When the device is moved over the surface the encoders and support member 14A transmit force to the ball 10 via housing 12. This, in turn, causes the ball 10 to rotate and the motion of the ball to be encoded. It is to be understood that the encoders and support member 14A apply minimal contact foces to the ball 10. This reduces the forces which would normally accumulate to cause skidding by the ball 10 on hard surfaces.

It is to be noted that support member 14A is at approximately a 45 degree angle with respect to the intersection of the axes of the encoders. This permits the support member 14A to act as a biasing support to keep ball 10 in contact with the encoders, while minimizing any frictional components on the ball 10 due to biasing.

The support members 14 and 14A are preferably positioned in the housing so that the ball 10 protrudes a predetermined distance out of bottom aperture 13. This predetermined distance is selected so that ball 10 will not contact housing 12 at top aperture 11 when the device is used as a mouse; that is, the amount by which ball 10 is upwardly displaced when used as a mouse is limited, so as to be insufficient to cause the top of ball 10 to make contact with the housing 12 at top aperture 11.

Referring to FIG. 3, the encoding portion of the present invention will be described in greater detail. Preferably, two encoders are used, one to resolve an X-coordinate value and another to resolve a Y-coordinate value from the motion of the surface of ball 10. The manner in which circular motion is resolved into linear motion, or cartesian coordinates, is well known. This subject is addressed in the illustrative patents referred to above. It is to be understood that the motion of the surface of ball 10 can be resolved into other coordinate systems without departing from the spirit of the present invention.

In the preferred embodiment of the present invention, each encoder includes a shaft 16, a contact surface 18, a pivot mount 22, encoding element 20, and biasing structure 24. These are illustrated in FIG. 3. The encoders are attached to the housing 12 by way of pivot mount 22. Pivot mount 22 is located at one end of shaft 16. Thus, each encoder is free to pivot with the motion of ball 10.

Contact surface 18 is positioned around a portion of shaft 16 so as to be tangentially positioned with respect to the surface of ball 10. Contact surface 18 is preferably formed of material, such as nylon, having a coefficient of friction selected so that the motion of the surface of ball 10 is accurately transmitted to shaft 16 such that components of rotation of the ball 10 which are parallel to the axis of rotation of shaft 16 are transmitted to the shaft 16, and so that friction resulting from components of rotation which are perpendicular thereto are minimized.

Encoding element 20 is positioned to be rotated by shaft 16, and includes a mechanism by which the rotation thereof can be converted into digital form suitable for use by a computer, for example.

Preferably, encoding element 20 is a quadrature optical encoder. Such optical encoders include a code wheel which is rotated by the motion of shaft 16, light sources, and optical detectors. The code wheel typically includes indicia which modulate light from the light source. The optical detector transforms the modulated light into electrical signals which are then interpreted by the user, such as a computer.

FIG. 4 illustrates one configuration for an encoder which can be used in the present invention. Preferably, the whole assembly is mounted on a platform 22. Shaft 16 is supported at one end by vertical member 28, and at the other end by vertical member 30. Encoding element 20 is shown positioned between structures 32 and 34. One of the structures, such as structure 32, can contain the light sources, while the other structure can house the optical detectors.

Pivot structure 22 can be seen in FIG. 4 to comprise a rod-like structure which is attached at one end of platform 22. The ends of the rod like structure can then be received by female risers 36 on housing 12 to provide the desired pivotting action.

By the above encoder structure, a modular encoder assembly can be realized. Thus, each encoder assembly can be fabricated and tested apart from the rest of the input device. This, in turn, permits simplified assembly of the entire device and a corresponding reduction in cost and time.

The terms and expressions which have been employed herein are used as terms of description and not of limitation, and there is no intention, in the use of such terms and expressions, of excluding equivalents of the features shown and described, or portions thereof, it being recognized that various modifications are possible within the scope of the invention claimed.

We claim:

1. An input apparatus for use with a computer comprising:
   a housing having a top aperture and a bottom aperture;
   a spherically shaped member supported for rotation within the housing, wherein the spherically shaped member has a radius which has been selected so that portions of the spherically shaped member protrude through the top and bottom apertures of the housing; and
   encoding means supported within the housing and in contact with the spherically shaped member for transforming the rotation of the spherically shaped member into computer compatible signals,
   whereby positional information can be input into a computer by either positioning the input apparatus on a surface, so that the portion of spherically shaped member which protrudes from the bottom aperture contacts the surface, and moving the input apparatus with respect to the surface, or by supporting the input apparatus, so that the portion of the spherical member protruding from the bottom aperture is unobstructed, and supplying motive force to the portion of the spherically shaped member which protrdues from the top aperture.

2. The input apparatus of claim 1 further including support means for rotatably supporting the spherically shaped member when the portion of the spherically shaped member which protrudes from the bottom aperture is positioned apart from any supporting surface, which support means are positioned to be disengaged from the spherically shaped member when the portion of the spherically shaped member which protrudes from the bottom aperture contacts with the supporting surface.

3. The input apparatus of claim 2 further including biasing means for maintaining the encoding means in contact with the spherically shaped member.

4. The input apparatus of claim 3 wherein the encoding means include
   a shaft pivotably supported at one end in the housing;
   contact means positioned on the shaft and in contact with the spherically shaped member for transmitting the rotation of the spherically shaped member to the shaft; and
   translating means for converting the motion of the shaft into computer compatible signals.

5. The input apparatus of claim 4 wherein the biasing means include spring means attached at one end to the housing and at the other end to the shaft of the encoding means.

6. The input apparatus of claim 2 wherein the spherically shaped member rotates about a midpoint and further wherein the support means include a plurality of rotating members positioned in the housing to support the spherically shaped member at points below the midpoint.

7. The input apparatus of claim 2 wherein the support means are positioned to permit the spherically shaped member to rotate freely whenever the portion of the spherically shaped member which protrudes from the bottom aperture contacts the supporting surface.

8. The input apparatus of claim 2 wherein the support means are positioned within the housing so that the spherically shaped member protrudes a predetermined distance from the bottom apertures, the predetermined distance being selected so that the spherically shaped member has a limited upward displacement when the portion of the spherically shaped member which protrudes from the bottom aperture is positioned on a supporting surface, the upward displacement being insufficient to cause the spherically shaped member from making contact with the housing at the top aperture.

* * * * *